Jan. 16, 1968     V. D. HUKERIKAR     3,363,709
HYDRAULIC DIFFERENTIAL GEAR FOR AUTOMOBILES AND LIKE VEHICLES
Filed Nov. 2, 1964
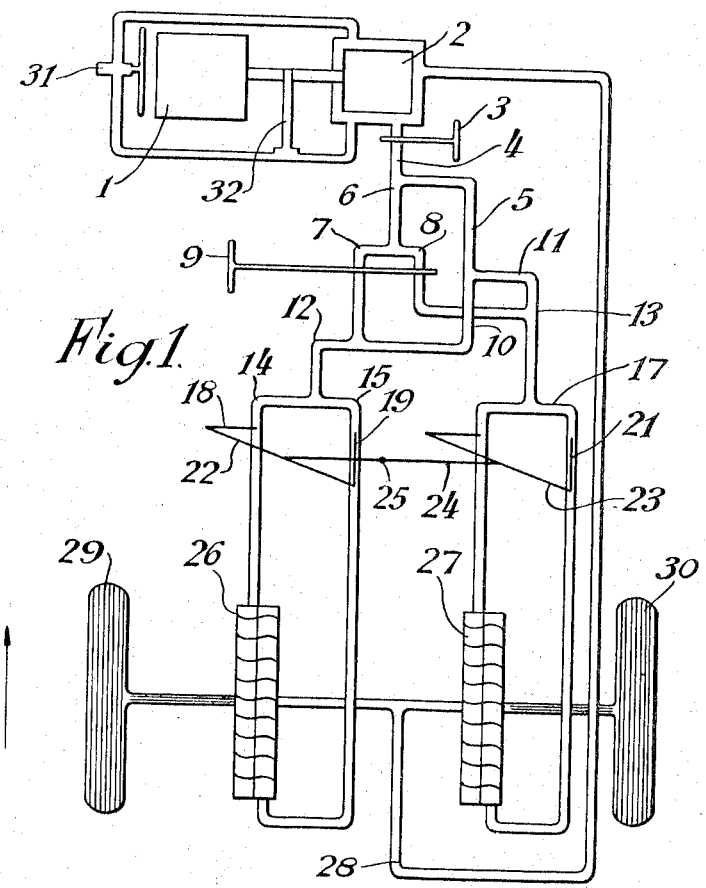
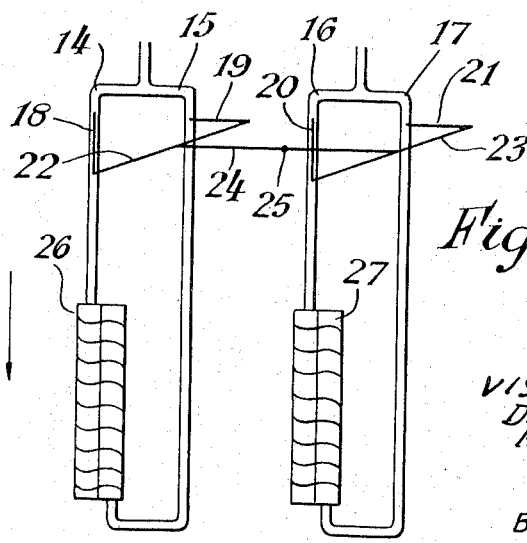
VISWANATH
DATTATREYA
HUKERIKAR
           INVENTOR
BY Richards and Cipelli
              ATTORNEYS

United States Patent Office 3,363,709
Patented Jan. 16, 1968

3,363,709
HYDRAULIC DIFFERENTIAL GEAR FOR AUTOMOBILES AND LIKE VEHICLES
Viswanath Dattatreya Hukerikar, Sukhadia Bhuvan, Dakor, Gujarath State, India, assignor to Dadajee Dhackjee & Company Private Limited, Bombay, India
Filed Nov. 2, 1964, Ser. No. 408,262
Claims priority, application Great Britain, Mar. 9, 1964, 9,875/64
6 Claims. (Cl. 180—6.48)

ABSTRACT OF THE DISCLOSURE

A hydraulic variable-speed and differential gear for automobiles and similar road vehicles is described including a prime mover such as an internal combustion engine, a pump, and two or four hydraulic driving means such as turbines connected to the drive wheels of the vehicle. The pump and turbines are connected by piping in a closed hydraulic system containing a hydraulic fluid. The speed of the vehicle is controlled by regulating the quantity of oil flowing to the turbines either by varying the speed of the prime mover or by the use of a valve to control the flow from the pump. Differential action of the drive wheels on turning is provided by valves controlled by the vehicle steering wheel and located in branches of the hydraulic system to act on a part only of the hydraulic fluid flowing to each turbine to reduce or increase its flow proportionately to the turning of the steering wheel to thus reduce the speed of rotation of the inner wheel and increase the speed of rotation of the outer wheel of the vehicle in a turn. Provision is made for forward and reverse movement of the vehicle. Fan means providing cooling for the prime mover in proportion to its speed is also provided.

This invention relates to a hydraulic differential gear suitable for all types of automobiles. An object of the invention is to obtain the differential action as in a conventional type automobile but without the use of a differential gearbox. Another object of the invention is to simplify the automobile structure by dispensing with the usual clutch gearbox, propeller shaft and the differential gearbox. One more object of the invention is to obtain infinitely variable gearing for automobiles.

According to this invention there is provided a hydraulic differential gear for automobiles, comprising an internal combustion engine directly coupled to an oil pump which drives hydraulic driving means such as two turbines coupled to the front or rear wheels of the automobile, the supply of oil being through a head race pipe and the quantity of oil flowing being regulated by the accelerator pedal which in the case of a constant speed engine operates by accentuating a vane in the valve fitted to the head race pipe and in a variable speed engine by directly varying the speed of the prime mover. The term "hydraulic driving means" as used herein is intended to include wheel driving means such as turbines and equivalent wheel driving means such as torque converters and inverse pumps.

The invention will now be described by way of example with reference to the accompanying drawings in which:

FIGURE 1 is a diagrammatic representation of the hydraulic differential gear in accordance with the invention, and FIGURE 2 is a similar representation of part of the system showing the position of the cocks for reversing the vehicle.

In FIGURE 1, a prime mover 1 consisting of an internal combustion engine is directly coupled to a centrifugal oil pump 2. 4 is the first head race pipe for two turbines 26 and 27. Oil flows from pump 2 through pipe 4. 3 is a valve on pipe 4, and is accentuated by the accelerator pedal. This is for a constant speed engine. In the case of a variable speed engine, however, the accelerator acts by directly varying the speed of the prime mover. When the accelerator pedal is gradually depressed by the driver's leg, it will increase the inflow through pipe 4 by increasing the vane opening in the case of a constant speed engine, and by increasing the speed of the pump in the case of a variable speed engine. The pipe 4 forks into two secondary head race pipes 5 and 6 respectively. The secondary head race pipe 6 forks into the form of a U-pipe of which 7 and 8 are the two branches. 9 is a valve fitted to the two branches of the above U-pipe. This valve 9 is accentuated by the steering wheel of the automobile and is so constructed that when the vehicle is going on a straight path, the vanes in the two branches 7 and 8 are equally open. However, when the steering wheel is rotated to turn the vehicle, the vanes in the two branches 7 and 8 are made to open by different extents such that the turbine coupled to the outer wheel gets more oil than the one coupled to the inner wheel. This variation in the vane opening in the two branches 7 and 8 is proportional to the amount of turn of the steering wheel. The pipe 5 secondary head race forks into two equal branch pipes 10 and 11 respectively. The branch pipes 7 and 10 combine to form pipe 12. The branch pipes 8 and 11 combine to form pipe 13. The pipe 12 forks into the form of a U-pipe of which 14 and 15 are the two arms. The pipe 13 forks into the form of a U-pipe of which 16 and 17 are the two arms. 18, 19, 20 and 21 are four cocks fitted to the four arms 14, 15, 16 and 17 respectively, such that when pipes 14 and 16 are closed, pipes 15 and 17 are open and vice versa. The cocks 18 and 19 are connected by a lever 22. The cocks 20 and 21 are connected by a lever 23. The middle points of the lever 22 and 23 are connected by a lever 24. 25 is a handle fixed to the middle point of the lever 24. This handle 25 is the forward and reverse control gear. 26 and 27 are two exactly similar oil turbines. Each turbine has two sets of blades. These sets of blades are arranged in opposite direction to each other. The pipes 14 and 15 are the head race pipes for the turbine 26. The pipes 16 and 17 are the head race pipes for the turbine 27. The oil from the tail races of the two turbines flow back to the pump 2 through the pipe 28. The impingement of the oil from the pipes 14 and 16 on the turbines 26 and 27 is such as to drive the vehicle in the reverse direction, while the impingement of the oil from the pipes 15 and 17 on the two turbines 26 and 27 is such as to drive the vehicle in the forward direction. The differential gear box of the conventional type automobile is replaced by the two turbines 26 and 27 which are directly coupled to (either front or rear) the wheels 29 and 30 respectively. It is advantageous to have a constant speed prime mover. The cooling fan for the prime mover is separately driven by a small oil turbine 31 whose speed is automatically regulated by a centrifugal governor 32 working off the shaft connecting the prime mover 1 to the pump 2. When the speed of the prime mover 1 decreases due to an overload, the governor 32 by admitting a higher quantity of oil to flow from pump 2 to turbine 31 regulates the speed of the turbine 31 at a constant level.

Now coming to the working of the hydraulic differential gear for automobiles the prime mover 1 drives the pump 2. For forward drive, cocks 18 and 20 on pipes 14 and 16 are closed. So cocks 19 and 21 on pipes 15 and 17 will be open. When the accelerator pedal is gradually depressed by the driver's leg, oil from pump 2 will start flowing through pipe 4. From pipe 4 the oil will flow through pipes 5 and 6. From pipe 5 the oil will branch off into two equal portions and will flow through the pipes 10 and 11. From pipe 6 the oil will branch off and flow through the pipes 7 and 8 respectively. When the vehicle is going on a straight road the cock 9 will admit equal quantities of oil to flow through the pipes 7 and 8 respectively.

(a) Therefore on a straight road the quantity of oil flowing through pipe 12 which is equal to the aggregate of the quantities of the oil flowing through the pipes 7 and 10 will be equal to the quantity of oil flowing through pipe 13 which is equal to the aggregate of the quantities of oil flowing through the pipes 8 and 11. In other words, on a straight path quantity of oil in pipe 12=quantity of oil in pipe 7 plus quantity of oil in pipe 10.

(b) Quantity of oil in pipe 13=quantity of oil in pipe 8 plus quantity of oil in pipe 11.

(c) Quantity of oil in pipe 12=quantity of oil in pipe 13.

From pipe 12 the oil will flow through the pipe 15 only since the valve 18 on pipe 14 is closed, while valve 19 on pipe 15 is open. Similarly since valve 20 on pipe 16 is closed and valve 21 on pipe 17 is open, the oil from pipe 13 will flow through pipe 17 only. The oil from pipe 15 will impinge on the blades of the turbine 26 thereby making it to rotate. Similarly the oil from pipe 17 will impinge on the blades of the turbine 27 thereby making it to rotate. Since the impingement of the oil from the two pipes 15 and 17 on the two turbines 26 and 27 is in the same direction the rotation of the two turbines will also be in the same direction. Also since the quantities and pressure of the oil from the pipes 15 and 17 impinging on the blades of the two turbines 26 and 27 are equal, the speeds of the two turbines will be equal. Since the turbines are directly coupled to the wheels 29 and 30 the vehicle will move.

Supposing now the vehicle is to turn to the right. When the steering wheel is rotated in the clockwise direction this will accentuate the cock 9 which will increase the vane opening on pipe 7 and decrease the vane opening on pipe 8. This variation will be proportional to the amount of turn of the steering wheel. So a higher quantity of oil will now flow through pipe 7 than through pipe 8. So the quantity of oil flowing through pipe 12 (=7 plus 10) will now be higher than that flowing through pipe 13 (=8 plus 11). So a greater quantity of oil will now impinge on the blades of turbine 26 than on turbine 27. Therefore turbine 26 will rotate at a higher speed than turbine 27 or wheel 29 will rotate at a higher speed than wheel 30.

Similarly, when the vehicle is to turn to the left the steering wheel is rotated in the anti-clock direction. So valve 9 will now admit a higher quanity of oil to flow through pipe 8 than through pipe 7. Therefore a higher quantity of oil will flow through pipe 13 than through pipe 12. This makes turbine 27 to rotate at a higher speed than turbine 26. Hence wheel 30 will now rotate at a higher speed than wheel 29.

FIGURE 2 shows the position of the cocks when it is desired to reverse the vehicle. This is done by accentuating the handle 25 on lever 24. This will accentuate the levers 23 and 22. This movement will cause the cocks 19 and 21 to close the pipes 15 and 17 respectively, and the cocks 18 and 21 to open the pipes 14 and 16 respectively. The impingement of the oil on the blades of the turbines 26 and 27 will now be opposite in direction to that of the previous case. Therefore the vehicle will now move in the reverse direction.

The speed of the vehicle which now depends on valve 3 and the differential action which depends on valve 9 are however unchanged.

The invention has the following advantages:

(1) The clutch, the gearbox, the propeller shaft and the differential gearbox are all eliminated. This will not only simplify the construction of the vehicle, but will also reduce its weight.

(2) The gearing is infinitely variable.

(3) In a conventional type vehicle, the wearing out of the wheels driven by the differential is uneven due to the differential. Also the friction on the slower wheel is much more than on the faster wheel. Here these disadvantages are overcome.

(4) In a conventional type vehicle when the coefficient of friction between the wheels and the road is low, the wheels driven by the differential have a tendency to rotate in the opposite direction to each other. Here that disadvantage is overcome.

(5) Internal combustion engines, particularly diesel engines are best suited for constant speeds.

(6) The fanning action of the cooling fan is higher at overloads unlike other engines where this serious problem of inadequate fanning at overloads is met with.

(7) In case of emergency, auxiliary braking may be resorted to by reversing the drive. By employing four turbines instead of two, a pushpull effect (four wheel drive) can be obtained. Over and above the single unit system, the pushpull system has the following advantages.

(8) Experience has shown that best reuslts are obtained when half the load is pushed and half the load is pulled.

(9) The double differential gear as used in jeeps is better termed a two axle drive rather than a four wheel drive. In this case since the four turbines drive the four wheels separately a real four wheel drive is obtained.

(10) In case the drive on one axle fails the vehicle will not be put out of action.

(11) The units may be used alternately to minimise wear and tear.

(12) The motion will be very smooth due to uniform torque on all wheels.

I claim:

1. In a combined hydraulic variable-speed and differential gear for road vehicles, comprising prime moving means, pump means coupled with and driven by said prime moving means, first head race means connected to said pump means, at least two secondary head race means connected to said first head race means, each of said secondary head race means being divided into two branches, the two branches of each secondary head race means rejoining each other to form a pair of conduits each connected to one of said secondary head race means, and at least two hydraulic driving means each connected to one of said secondary head race means through one of said conduits, each hydraulic driving means being adapted to be connected to a drive wheel of a road vehicle, and means for controlling the speed of the vehicle by regulating the flow of hydraulic fluid through said first head race means, and wherein said pump means, first and secondary head race means, branches, conduits and hydraulic driving means are all part of a closed hydraulic system containing hydraulic fluid; the improvement which comprises: in combination, valve means for varying fluid flow located in each of the two branches of one of said secondary head race means and connected to and operable by means of the steering wheel of a road vehicle, flow of hydraulic fluid being unrestricted in both branches of one of said secondary head race means but being subject to variable control by said valve means in the two branches of the other secondary head race means, whereby by operation of said valve means varying amounts of hydraulic fluid may be fed to one of said hydraulic driving means with respect to the other hydraulic driving means, the variation of flow of hydraulic fluid into said hydraulic driving means being proportional to the amount of turn of a road vehicle steering wheel, thus providing a differential action between the wheels of a road vehicle for turning purposes.

2. A combined hydraulic variable-speed and differential gear for road vehicles according to claim 1, wherein the prime moving means operates at a constant speed and wherein said means for controlling the speed of the vehicle by regulating the flow of hydraulic fluid through the first head race means is a valve disposed in said first head race means.

3. A combined hydraulic variable-speed and differential gear for road vehicles according to claim 1, wherein the prime moving means is operable at variable speeds, and which includes means for directly varying the speed of said prime moving means to regulate the flow of hydraulic fluid through the first head race means and thus control, the speed of the vehicle.

4. A combined hydraulic variable-speed and differential gear for road vehicles according to claim 1 wherein said hydraulic driving means are turbines each having two sets of blades set in opposite directions, and wherein each of the conduits formed by the rejoined branches of said secondary head race means is divided into two branches which are connected to opposite sides of the corresponding turbine, and means for directing flow of hydraulic fluid into one side of each turbine at a given time and into the opposite side at another time, thus causing the fluid to act on the one of the two sets of blades set in opposite directions which is operable by flow of fluid in the predetermined direction, thus providing for forward and reverse motion of the vehicle.

5. A combined hydraulic variable-speed and differential gear for road vehicles according to claim 4 wherein said prime moving means is an internal combustion engine coupled to said pump by a drive shaft, and including a cooling fan for said engine, a separate small hydraulic turbine connected to and driving said fan, said turbine being connected to and driven by fluid from said pump, and a governor operably connected to said drive shaft for automatically regulating the speed of said turbine and said fan, thus providing cooling varying in direct relation to the speed of the internal combustion engine.

6. In a combined hydraulic variable-speed and differential gear for road vehicles, comprising prime moving means, pump means coupled with and driven by said prime moving means, first head race means connected to said pump means, at least two secondary head race means connected to said first head race means, at least two hydraulic driving means each adapted to be connected to a drive wheel of a road vehicle, and means for controlling the speed of the vehicle by regulating the flow of hydraulic fluid through said first head race means, and wherein said pump means, first and secondary head race means, and hydraulic driving means are all connected in a closed hydraulic system containing hydraulic fluid; the improvement which comprises: in combination, a pair of branch lines connected to each of said secondary head race means, one branch line connected to each of said secondary head race means joining one of the branch lines of the other secondary head race means to form one of a pair of conduits, each of said conduits being divided into a pair of arms, the arms of each pair being connected to opposite sides of one of said hydraulic driving means, and valve means for varying fluid flow in each of one pair of said branch lines connected to one of said secondary head race means and connected to and operable by means of a steering wheel of a road vehicle, flow of hydraulic fluid being unrestricted in the branches of one of said secondary head race means but being subject to variable control by said valve means in the branches of the other secondary head race means, whereby by operation of said valve means varying amounts of hydraulic fluid may be fed to one of said hydraulic driving means with respect to the other hydraulic driving means, the variation of flow of hydraulic fluid into said hydraulic driving means being proportional to the amount of turn of a road vehicle steering wheel, thus providing a differential action between the wheels of a road vehicle for turning purposes.

References Cited

UNITED STATES PATENTS

| 874,432 | 12/1907 | Porscke | 253—51 |
| 2,518,578 | 8/1950 | Linson. | |
| 2,711,077 | 6/1955 | Adams | 180—6.48 |
| 2,949,971 | 8/1960 | Cline | 180—6.3 |
| 3,233,691 | 2/1966 | De Biasi | 180—6.48 |

FOREIGN PATENTS 882,110 2/1943 France.

BENJAMIN HERSH, *Primary Examiner.*

J. A. PEKAR, *Assistant Examiner.*